UNITED STATES PATENT OFFICE.

CHARLES M. HALL, OF NIAGARA FALLS, NEW YORK.

PURIFIED CRYSTALLINE ALUMINA.

SPECIFICATION forming part of Letters Patent No. 677,209, dated June 25, 1901.

Application filed February 20, 1901. Serial No. 48,169. (No specimens.)

*To all whom it may concern:*

Be it known that I, CHARLES M. HALL, of Niagara Falls, in the county of Niagara and State of New York, have invented a new and useful Purified Crystalline Alumina, of which the following is a full, clear, and precise description.

My new product is made by the purification of bauxite or other impure oxid or silicate of aluminium by the process of fusing the same and reducing the impurities. Such processes I have described and claimed in pending patent applications Serial No. 40,369, filed December 19, 1900, Serial No. 40,650, filed December 21, 1900, and Serial No. 45,731, filed February 2, 1901. The product has new and useful properties which adapt it peculiarly for use as an ore in the electrolytic manufacture of aluminium. I will first describe the process by which I prefer to manufacture the said product.

I take bauxite, which may be approximately of the following composition, though the same process may be applied to the treatment of bauxite of various grades and kinds of impurities: alumina, sixty per cent.; ferric oxid, eighteen per cent.; silica, two to three per cent.; titanic acid, three to four per cent.; water, seventeen per cent. Having calcined the bauxite, I place it in a suitable electric furnace, preferably lined with carbon, and fuse it therein, preferably first mixing with it powdered carbon sufficient to amount to eight to ten per cent., more or less, in order to assist in the reduction, although this is not always necessary, since the carbon of the electrodes and of the furnace-lining will suffice. A more impure bauxite will require a greater percentage of carbon. It is desirable to avoid a large excess of carbon, which causes a waste of the alumina and has a prejudicial effect.

I may use either a direct or an alternating current at an electromotive force of, say, twenty-five to thirty volts with a suitable volume. Working on a small scale with a furnace of about eight inches internal diameter I have employed about twenty-eight volts and about fifteen hundred amperes, or I may fuse the mixture with an electric arc maintained in the midst of the mass, the carbon-lined furnace forming an electrode at the start of the operation and a carbon rod or bunch of carbon rods forming another electrode. This electrode is gradually raised in order to keep it at or above the surface of the fused portion of the mass, and as the mixture fuses and settles down more of it may be added until the furnace-cavity is nearly full, whereupon purified alumina may be thrown on top of the mass to cover it while the last of the material to be purified is being fused. In using an arc as thus described I have employed with success a current of about sixty volts with volume sufficient to give one hundred and fifty to two hundred horse power. I subject the mass to the fusing action of the current for some time, depending upon the size of the operation. When working on a small scale, I have found one hour sufficient to accomplish both the fusion of the bauxite and the separation of the impurities, and on a larger scale it is desirable to continue the operation for a longer time on account of the greater mass of material to be fused. During this operation by the action of the carbon and, where a direct current is used and the conditions for electrolysis are present, by the electrolytic action of the current the iron, silicon, and titanium are reduced and unite to form a fused alloy, the bulk of which settles to the bottom. The mass is then allowed to cool and is taken from the furnace, and the iron containing the other impurities is separated from it, the finer particles of the alloy which remain shotted through the mass being picked out with a magnet or otherwise. When working on a large scale, it may be found desirable to tap off the purified alumina and the reduced alloy in a melted condition. The purified material may then be pulverized for use.

The reduction of the impurities may be effected by fusing the bauxite with intermixed aluminium, as described in my application Serial No. 45,731, in which case the aluminium and the carbon of the electrodes act conjointly as reducing agents. I may aid in the elimination of the silicon by adding to the mass a fluorid compound, as described and claimed in my application Serial No. 40,650. The product thus made by fusion of the bauxite and reduction of the impurities has several characteristics which distinguish it from other commercial forms of alumina. Being a product of fusion, it is crystalline. It is more or less granular, although before pulverizing it is coherent, and especially where the reducing action has been strong or long continued it is friable. These are desirable qualities, since they render it easier to pulverize the material. It generally possesses a peculiar odor resembling that of the gas evolved during the solution of metallic iron in acids. This odor is developed more strongly by hammering or grinding or by breathing upon the material or moistening it with water or hydrochloric acid. The odor is strongest in the product which has been most strongly reduced. My product is partly soluble in hydrochloric acid or caustic alkalies, the more strongly reduced product being the more soluble. The gas evolved during the solution contains methane, which indicates the presence in the product of aluminium carbid, and it also contains hydrogen, which indicates the presence of aluminium suboxid, probably $Al_3O_4$. My product possesses reducing power, and this property, which it possesses when freshly prepared, persists unless means are taken to destroy it. The reducing power may be shown by removing from the powdered material with a magnet any particles of iron which it may contain and placing the material in a weak acidulated red solution of permanganate of potassium, the decolorizing of which will evidence the reducing quality. My product is of greater specific gravity than amorphous alumina—i. e., alumina made by precipitation and calcination—and is of less specific gravity than alumina crystallized from mere fusion and containing the same proportion of foreign metals or their compounds. Determinations which I have made have shown a specific gravity ranging from about 3.70 to about 3.93. The determination of the specific gravity should be made of the material when in a finely-powdered state in order to avoid the uncertainty produced by the cavities which are found in fused alumina. My product when freshly prepared increases in weight on prolonged ignition in air or oxygen and more rapidly if it has been previously moistened with nitric acid. On careful analysis the more highly reduced specimens show a distinctly higher proportion of aluminium than would be contained if all the aluminium were present solely as $Al_2O_3$. My product is pure, by which I mean commercially pure, sufficiently free from iron and silicon to be useful as an ore for making commercially-pure aluminium. It need not contain any soda unless soda is purposely introduced, and soda is an objectionable impurity invariably present in alumina made by processes heretofore used in the art. Its crystalline and granular structure and its greater density and specific gravity render my product easy to add to fused baths, for it will remain on the bath without waste until it is stirred in and dissolved, while the present alumina of commerce, being light and fluffy, is easily carried off by currents of hot air and hot gas, and some of it is thus lost.

I claim as my invention—

1. As a new article of manufacture, alumina having the following characteristics, namely, substantial freedom from silicon and iron; a crystalline structure; greater specific gravity than amorphous alumina, and less specific gravity than crystalline and unreduced alumina containing the same small proportions of foreign metals or their compounds; substantially as described.

2. As a new article of manufacture, alumina having the following characteristics, namely: substantial freedom from iron and silicon, and a crystalline and friable granular structure; substantially as described.

3. As a new article of manufacture, alumina having the following characteristics, namely; substantial freedom from silicon and iron crystalline structure; and, when freshly made, a reducing action upon a weak acidulated solution of permanganate of potassium; substantially as described.

4. As a new article of manufacture, alumina having the following characteristics, namely: substantial freedom from silicon and iron; and a crystalline structure; and containing a higher proportion of aluminium than would be contained if the aluminium were present solely as $Al_2O_3$; substantially as described.

CHARLES M. HALL.

Witnesses:
 THOMAS W. BAKEWELL,
 GEO. S. HARRAH.